United States Patent Office 3,384,615
Patented May 21, 1968

3,384,615
STABILIZATION OF POLYAMIDES
Elias R. Agouri, Pau, France, and Helmut Müller, Binningen, Switzerland, assignors to W. R. Grace & Co., New York, N.Y., a corporation of Connecticut
No Drawing. Filed May 16, 1966, Ser. No. 559,364
5 Claims. (Cl. 260—45.9)

This invention relates to the heat stabilization of synthetic, amorphous, linear, transparent polyamides of terephthalic acid, iosphthalic acid, or a mixture of these acids. These polyamides are disclosed in U.S. Patent Nos. 3,150,113, 3,198,771, 3,150,117, 3,145,193 and British Patent Nos. 977,868, and 987,962.

The polyamides of U.S. Patent No. 3,150,117 are linear, amorphous, transparent, film-forming polyamides of terephthalic acid, isophthalic acid and mixtures of these acids and an alkyl-substituted hexamethylenediamine wherein the main hydrocarbon chain contains at least three side chain carbon atoms in the form of one or more alkyl groups. Suitable substituted hexamethylenediamines are, for example, 2-methyl-4-ethylhexamethylenediamine; 2-ethyl - 4 - methylhexamethylenediamine; 2,2,4-trimethylhexamethylenediamine; 2,4,4 - trimethylhexamethylenediamine; 2,2,5,5-tetramethylhexamethylenediamine; 3-isopropylhexamethylenediamine; 3-isooctylhexamethylenediamine; 3-isododecylhexamethylenediamine and 2,4-diethylhexamethylenediamine.

U.S. Patent No. 3,198,771 discloses a synthetic, amorphous, linear, transparent polyamide formed from terephthalic acid, isophthalic acid and mixtures of these acids and a diamine having an alkyl-substituted saturated hydrocarbon chain 6 to 10 carbon atoms in length in which the alkyl substituent consists of one ethyl group.

In U.S. Patent No. 3,145,193, the amorphous polyamide is formed from an acid mixture comprised of terephthalic acid and isophthalic acid and a diamine having an alkyl-substituted saturated hydrocarbon chain 7 to 10 carbon atoms in length with up to 18 carbon atoms in one or more side chains introduced by the alkyl substitution of the main hydrocarbon chain. Suitable alkyl-substituted diamines are, for example, 2-methyl-4-ethylheptamethylenediamine; 2-ethyl-4-methylheptamethylenediamine; 2,2,5,5-tetramethylheptamethylenediamine; 3-isopropylheptamethylenediamine; 3-isooctylheptamethylenediamine; 3,3, 5 - trimethyloctamethylenediamine; and 2,4-diethyloctamethylenediamine.

U.S. Patent No. 3,150,113 disclose a transparent polyamide formed from terephthalic acid an a mixture of 3-methyl- and 2-methyl-hexamethylenediamine.

In British Patent No. 987,962 a glass clear polyamide is formed from terephthalic acid, isophthalic acid and mixtures thereof, and a mixture of aliphatic diamines. The diamine mixture is comprised of about 95 to 70 percent by weight of a substituted polymethylene diamine having a straight hydrocarbon chain of at least 6 carbon atoms, said straight chain being substituted by at least one alkyl group, the total number of side chain carbon atoms introduced by alkyl substitution being at least 3, and about 5 to 30 percent by weight of an unsubstituted polymethylene diamine of the same chain length. Preferably, the substituted diamine is 2,2,4-trimethylhexamethylenediamine, 2,4,4-trimethylhexamethylenediamine or mixtures of these isomeric diamines, and the unsubstituted polymethylene diamine is hexamethylenediamine.

British Patent No. 977,868, discloses a polyamide formed from 3-amino-methyl-3,5,5-trimethyl-cyclohexylamine and an acid mixture comprised of adipic acid and terephthalic acid or isophthalic acid or mixtures thereof.

The invention provides a method of heat-stabilizing polyamides of the aforesaid kind which, unlike known processes, does not adversely affect the color or clarity of the polymer, and which is also without adverse effect on the moldability and solubility of the polyamides.

According to the present invention, a heat-stabilized polyamide composition comprises a synthetic, linear, amorphous polyamide such as those defined above, an alkyl-substituted diphenylamine, a phosphorous acid or salt or ester thereof, and a hydrogen, alkali metal, or alkaline earth metal chloride, bromide or iodide.

The alkyl-substituted diphenylamine has at least one alkyl substituent on each phenyl group. Generally, the alkyl substituents contain 4 to 12 carbon atoms each. Preferably, the alkyl-substituted diphenylamine is the reaction product of diphenylamine and diisobutylene ("Octamine"). "Octamine" is a light brown granular waxy solid having a specific gravity of 0.99 and a melting range of 75 to 85° C. It is soluble in gasoline, benzene, ethylene dichloride and acetone, but insoluble in water. It is believed to be a mixture of $C_8$ alkylated diphenylamines having the following formula:

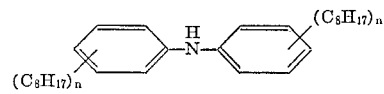

where $n$ is 1, 2 or 3. Other suitable alkylated diphenylamines include di-t-butyldiphenylamine, di-neopentyldiphenylamine, and di-isododecyldiphenylamine.

The alkyl-substituted diphenylamine can be used in an amount ranging from 0.1 to 1.0%, preferably 0.2 to 0.5% by weight, of the polyamide. Generally, use of the alkyl-substituted diphenylamine in an amount higher than 1.0% by weight of the polyamide has little beneficial effect.

The phosphorous compound is preferably phosphorous acid ($H_3PO_3$) itself but may also be, for example, sodium or potassium phosphite or hyphosphite or a tri(alkyl) phosphite, e.g. triethyl phosphite or tri isooctyl phosphite. The proportion of the phosphorous compound is generally from 0.02 to 1%, preferably 0.05 to 0.3%, by weight of the polyamide.

The halide constituent is preferably an iodide, especially sodium, calcium, or more particularly, potassium iodide. About 0.01 to 0.1%, preferably 0.02 to 0.06%, by weight of the polyamide should ordinarily be used. More than 0.1% by weight of the halide is liable adversely to effect the transparency of the polyamide.

The three stabilizing ingredients are most conveniently incorporated in the polyamide by mixing with the starting materials used in the polycondensation, and then carrying out the polycondensation in the known manner. It is also possible, however, to incorporate the three stabilizing ingredients in the polyamide by melting the latter and thoroughly mixing in the ingredients using conventional techniques for dispersing solids in molten polymers.

The following examples illustrate the invention. Parts and percentages are by weight unless otherwise indicated.

Example 1

16.6 parts of terephthalic acid were mixed with 30 parts of water and brought almost to boiling on a steam bath. Using a dropping funnel, a solution of 16.5 parts of a mixture of 2,2,4- and 2,4,4 - trimethylhexamethylene diamine in 50 parts of ethanol were added slowly dropwise. When all the diamine had been added, the terephthalic acid dissolved. After cooling, the mixed diamine terephthalate salts crystallized out.

A mixture of 300 parts of the salt thus obtained, 100 parts of water, 0.9 part of Octamine, 0.12 part of potassium iodide, 0.33 part of phosphorous acid, and 0.5 part of glacial acetic acid, was heated to 140° C. with constant stirring in an autoclave in the absence of air. The temperature of the mixture was raised and water vapor vented to reduce the pressure in the autoclave until the mixture reached 250° C. and atmospheric pressure. The mixture, now substantially free from water, was heated to 280° C. over a period of 3½ hours and then held at this temperature for a further two hours. The polymer melt obtained was extruded into cold water to form rods. The solid polymer was transparent and glass clear. It melted over a range of 190° C. to 220° C. and had an intrinsic viscosity of 1.50. Part of the polyamide was cut into chips and injection-molded to form dumbbell shaped test pieces 1 x 2 mm. in cross-section, which were subjected to the tests detailed below.

For purposes of comparison, test pieces were made from (a) a polyamide prepared as described above but containing no stabilizer, (b) a polyamide prepared as described above but containing only 0.9 part of Octamine and 0.33 part of phosphorous acid as stabilizers, (c) a polyamide prepared as described above but containing only 0.9 part of Octamine as stabilizer, and (d) a polyamide prepared as described above but containing only 0.12 part of potassium iodide and 0.33 part of phosphorous acid as stabilizers.

The dumbbell test pieces were heated in an oven through which air was circulated at 135° C. for 2 weeks, or 1, 2, 3 or 4 months. They were then conditioned at 20° C. and 100% relative humidity for 4–5 days before testing. After conditioning, the water content of the test pieces was about 1.5%. The tensile strength and elongation of the test pieces were measured (under standard conditions of 20° C. and 65 percent relative humidity and the clamping jaws were moved with such speed that break of the test piece occurred after 60 seconds) both before and after the heat treatment. The results obtained were as follows. The tensile strengths and elongations are expressed as a percentage of the value before the heat treatment.

Patent No. 3,150,117) was stabilized with 0.5% of Octamine, 0.05% of potassium bromide and 0.1% of triisooctyl phosphite. After 9 weeks exposure at 130° C., the elongation and tensile strength of the injection-molded dumbbell remained practically unaltered. The oxygen uptake, measured as described in Example 1, was 1.2 cm.³ per gram. Injection-molded plates, 3 mm. thick, were clear and only slightly discolored (yellowish) after the 9 weeks' heating, whereas the unstabilized polymer turned dark brown during the same period under the same conditions.

Example 3

Polyamide made from 95% of terephthalic acid and 5% isophthalic acid and 3-isopropyl-hexamethylene diamine (as described in U.S. Patent No. 3,150,117) was stabilized with 0.25% of Octamine, 0.04% of potassium iodide and 0.05% of sodium hypophosphite. The transparent clear polyamide was exposed in an oven at 140° C., and tested for heat stability as described in Example 1. In this test, the polymer had suffered substantially no change in tensile strength and elongation after seven weeks heating. Injection-molded plates 3 mm. thick, were clear and only slightly discolored (yellowish) after the seven weeks' heating, whereas the unstabilized polymer turned dark brown during the same period under the same conditions.

What is claimed is:

1. A heat-stabilized polyamide composition comprising a synthetic linear amorphous polyamide and stabilizing amounts of, an alkyl-substituted diphenylamine said alkyl having from 4–12 carbon atoms; a phosphorous compound selected from the group consisting of phosphorous acid, a salt of a phosphorous acid, and an ester of phosphorous acid; and a halide selected from the group consisting of hydrogen chloride, hydrogen bromide, hydrogen iodide, an alkali metal chloride, an alkali

TABLE

| | Properties after— | | | | | | | | | Color |
|---|---|---|---|---|---|---|---|---|---|---|
| | 2 weeks | | 1 month | | 2 months | | 3 months | | 4 months | |
| | Tensile strength | Elongation | Tensile strength | Elongation | Tensile strength | Elongation | Tensile strength | Elongation | Tensile strength | Elongation | |
| Polyamide: | | | | | | | | | | | |
| Unstabilized | 26.5 | 7 | | | | | | | | | Dark brown. |
| Containing Octamine and phosphorous acid | 100 | 100 | 85 | 79 | 48 | 42 | 0 | 0 | | | Light brown. |
| Containing Octamine only | 100 | 97 | 86 | 75 | 50 | 44 | 0 | 0 | | | Brown. |
| Containing potassium iodide and phosphorous acid | 30 | 25 | 10 | 7 | 0 | 0 | | | | | Light yellow, clear. |
| Stabilized in accordance with this invention, i.e., containing Octamine, phosphorous acid and potassium iodide | 100 | 100 | 100 | 100 | 100 | 100 | 100 | 100 | 75.5 | 20.3 | Light yellow clear. |

Oxygen absorption of the above described unstabilized and stabilized polyamides was determined by an accelerated test in which the amount of oxygen reacting with the sample was measured. A reaction vessel consisting of a curved tube with a ball-shaped end was connected to a U-tube containing mercury and sealed at one end. Soda lime and silica gel were used as absorbents for $CO_2$ and $H_2O$. One gram of unstabilized polyamide was placed in the bulb. The air in the apparatus was replaced by oxygen by alternate evacuation and refilling with oxygen. The reaction vessel was placed in a silicone oil bath heated to 150° C. The oxygen uptake was measured after 48 hours, and was 6.5 cm.³ per gram. The stabilized polyamide according to this invention (i.e., containing Octamine, phosphorous acid and potassium iodide) had an oxygen uptake of only 1 cm.³ per gram.

Example 2

Polyamide made from terephthalic acid and 2-ethyl-4-methylhexamethylene diamine (as described in U.S.

metal bromide, an alkyl metal iodide, an alkali-earth metal chloride, an alkali earth metal bromide and an alkali earth metal iodide.

2. A composition according to claim 1 wherein said alkyl substituted diphenylamine is present in an amount of 0.1 to 1% by weight of the polyamide, said phosphorous compound is present in an amount of 0.02 to 1% by weight of the polyamide and said halide compound is present in an amount of 0.01 to 0.1% by weight of the polyamide.

3. A composition according to claim 1 wherein said alkyl-substituted diphenylamine is a member of the group consisting of di-t-butyldiphenylamine, di-neopentyldiphenylamine, di-isododecyldiphenylamine and the reaction product of diphenylamine and diisobutylene.

4. A composition according to claim 1 wherein said phosphorous compound is selected from the group consisting of phosphorous acid ($H_3PO_3$), sodium phosphite, sodium hyphosphite, potasium phosphite, potassium hyphosphite, triethyl phosphite and triisooctyl phosphite.

5. A composition according to claim 1 wherein said halide is a member of the group consisting of potassium iodide, sodium iodide and calcium iodide.

References Cited

UNITED STATES PATENTS 3,160,597 12/1964 Costain et al. _____ 260—45.9
2,530,769 11/1950 Hollis _____ 260—45.9
3,274,150 9/1966 Baevsky _____ 260—45.9

FOREIGN PATENTS 708,029 4/1954 Great Britain.

DONALD E. CZAJA, Primary Examiner.
H. E. TAYLOR, Assistant Examiner.